United States Patent [19]

Lazzari

[11] Patent Number: 4,698,708
[45] Date of Patent: Oct. 6, 1987

[54] DEVICE FOR MAGNETICALLY READING AND WRITING ON A FLYING SUPPORT

[75] Inventor: Jean-Pierre Lazzari, Corenc, France

[73] Assignee: Commissariat a l'Energie Atomique, Paris, France

[21] Appl. No.: 696,486

[22] Filed: Jan. 30, 1985

[30] Foreign Application Priority Data

Feb. 3, 1984 [FR] France ............................ 84 01881

[51] Int. Cl.⁴ .............................................. G11B 5/60
[52] U.S. Cl. .................................. 360/103; 360/108; 360/126
[58] Field of Search ............... 360/103, 102, 125–127, 360/110, 108; 29/603

[56] References Cited

U.S. PATENT DOCUMENTS

| 2,961,494 | 11/1960 | Darou, Jr. et al. | |
| 3,657,806 | 4/1972 | Simon. | |
| 3,922,776 | 12/1975 | Alger | 360/103 X |
| 4,321,641 | 3/1982 | Lee | 360/103 X |

FOREIGN PATENT DOCUMENTS

| 0032230 | 7/1981 | European Pat. Off. | |
| 0080373 | 6/1983 | European Pat. Off. | |
| 57-98120 | 6/1982 | Japan | 360/110 |

OTHER PUBLICATIONS

IBM Technical Disclosure Bulletin, vol. 21, No. 12, May 1979, p. 5002, New York, U.S., K. E. Petersen: "Thin Film Magnetic Heads".
Patents Abstracts of Japan, vol. 1, No. 103, Sep. 13, 1977, p. 3310E77; & JP A 52 36016 (Hitachi Seisakusho K.K.) Mar. 19, 1977.
Patents Abstracts of Japan, vol. 1, No. 119, Oct. 11, 1977, p. 4772E77; & JP A 52 50711 (Hitachi Seisakusho K.K.) Apr. 23, 1977.
IBM Technical Disclosure Bulletin, vol. 25, No. 7A, Dec. 1982, p. 3173, New York, U.S., G. Klaus et al.: "Sliders for Magnetic Heads of Surface-Hardened Silicon with Integrated Electronic Components".
Patents Abstracts of Japan, vol. 7, No. 224 (P-227)[1369], Oct. 5, 1983; & JP A 58 114 328 (Fujitsu K.K.) Jul. 7, 1983.
IBM Technical Disclosure Bulletin, vol. 15, No. 7, Dec. 1972, pp. 2183, 2184, New York, US; W. A. Warwick: "Multilayer Ceramic Slider for Thin-Film Heads", p. 2183.

Primary Examiner—A. J. Heinz
Attorney, Agent, or Firm—Oblon, Fisher, Spivak, McClelland & Maier

[57] ABSTRACT

Device for reading and writing on a magnetic recording support.

The device comprises magnetic read and write heads located on the upper faces of reliefs forming a catamaran, each head having a coil in a plane parallel to said face and having at least one read and write pole piece flush with the upper face of the reliefs.

Application to magnetic disks in computers.

3 Claims, 12 Drawing Figures

DEVICE FOR MAGNETICALLY READING AND WRITING ON A FLYING SUPPORT

BACKGROUND OF THE INVENTION

1. Field of the Invention

The present invention relates to a device for reading and writing on a magnetic support and to its production process. It is used in the production of rigid magnetic disk memories used in computers.

2. Discussion of Background

The reading and writing devices must be placed very close to the magnetic surface constituting the information support. In the case of a rigid support, such as e.g. a magnetic disk, the contact of the device with the disk may lead to surface defects and scratching. In order to reduce this risk, the magnetic reading and writing heads are fixed to a special support, whose surface e.g. is shaped like a catamaran. This shape enables the support to literally fly over the surface of the disk, the support being carried by the film of air which is entrained by the rotation of the disk. The flight height is generally less than 1 micron.

FIG. 1 shows in perspective view, a prior art device of this type. It comprises a support 12, whose flight or displacement surface 2 faces the disk. During operation, a pressure is exerted on the support, which can be compensated by a not shown load and localized in an upper slot 8. The leading face 6 of the catamaran has a chamfer-like configuration.

The device comprises two read and write heads 10 having an air gap 14. These heads are opposite to chamfer 6 and on a side face 16. This arrangement enables the air gaps 14 to be at the lowest point during the flight or displacement of the support, because the plane thereof is slightly inclined relative to that of the disk during its displacement.

The read and write heads 10 placed on the side face 16 of the support have a structure and a position which can be called vertical (or transverse or perpendicular) in the sense that they have two pole pieces substantially perpendicular to the recording support and separated by an air gap level with the surface of the flight or displacement plane. Each head also comprises an exciting and reading coil, whose plane is also perpendicular to the recording support. Thus, the assembly is oriented perpendicular to the displacement surface 2.

In order to produce catamaran profiles, like that of FIG. 1, use is made of the property of certain crystalline materials, such as silicon, according to which chemical etching of an orientation 100 crystal face leads to the appearance of chamfers oriented according to 111 crystal planes. This known procedure, called reticular etching, leads to the appearance of walls inclined by 55° relative to the 100 plane.

Catamaran-like supports with vertical heads are described in the Japanese Patent Abstract published in Patents Abstracts of Japan, Vol 1, No. 103, p. 3310 E 77 of 13.9.1977 corresponding to Japanese Patent Application JP-A-52 36016 of 19.3.1977 entitled "Manufacturing Method for Floating Magnetic Head".

The reticular etching process for producing such a support is more particularly described in the Japanese Patent Abstract which appeared in Patents Abstracts of Japan, Vol. 1, No. 119, p. 4772 E 77 of 11.10.1977, corresponding to Japanese Patent Application JP-A-52 50711 of 23.4.1977 entitled "Process for the Production of Slider".

However, such devices with perpendicular heads suffer from a major disadvantage. In order to produce such a device, it is necessary to start from a thick silicon section, on one of whose faces is deposited the read and write heads (which corresponds to face 16). This is followed by the cutting of said section in a direction perpendicular to the face containing the heads. This leads to substrates which are subjected to reticular etching on a face perpendicular to the face containing the head (which corresponds to face 2).

Thus, such a process requires a thick silicon seciton (4 to 5 mm), which is expensive. Moreover, it is necessary to work along two perpendicular faces (faces 16 and 2), which requires complex equipment and technology. Finally, the electrical connections with the head coil must be established on the section of the support (face 16) and then brought onto the upper face, which is complicated.

SUMMARY OF THE INVENTION

The object of the present invention is to obviate these disadvantages. It therefore recommends a different structure of the device, which permits the use of standard silicon wafers, such as are used in integrated circuit technology (i.e. they are very thin). Moreover, the invention makes use of a treatment only relating to one face of the wafer (in practice one face and the facing face). It is therefore easy to construct the device according to the invention and the costs thereof are considerably reduced.

This objective is achieved by an original arrangement of the read and write head, which is now located on the actual flight or displacement surface instead of on one side face of the support. Therefore, the head must have a different construction and the vertical arrangement is no longer suitable, so that the head is of the horizontal type. Moreover, the electrical connections with the head coil take place across the silicon wafer, through openings made from the face opposite to the flight or displacement surface.

More specifically, the present invention relates to a device for reading and writing on a magnetic recording support comprising at least one magnetic read-write head produced on a support, which has a catamaran-type profile, etched in a 100 crystal face of a monocrystalline silicon wafer, said profile having two reliefs with an upper planar face and two sides inclined in accordance with 111 crystal planes, wherein the magnetic read and write heads are arranged on the upper faces of the reliefs at one end thereof, each head having a coil in a plane parallel to said face and having at least one read and write pole piece flush with the upper face of said reliefs, the device also comprising pyramidal holes on the sloping walls according to 111 crystal planes, the holes completely traversing the silicon wafer and are covered with a metal coating, which is in contact with conductors connected to the coils of the read and write heads.

The term "at least one magnetic pole piece" is understood to cover perpendicular recording heads which have a main pole and horizontal recording heads which have two pole pieces separated by an amagnetic air gap.

The invention also relates to a process for producing a device like that defined hereinbefore. This process comprises in the case of a monocrystalline silicon wafer with first and second crystal faces (100) depositing on the first face read and write heads having a horizontal structure, covering said heads with a masking layer, carrying out reticular etching of said first silicon face so as to expose reliefs with oblique sides oriented in accordance with the 111 crystal planes of the wafer, forming pyramidal holes by reticular etching on the second face of the wafer, said holes having walls oriented in accordance with 111 crystal planes, said holes traversing the silicon wafer and issuing onto the first face, depositing a coating of metal in said holes in order to establish a connection between the two faces of the wafer, said coating beng connected by conductors to the coils of the heads on the other face and cutting the silicon wafer in order to separate pairs of reliefs, each pair forming a catamaran-type support with two read and write heads.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
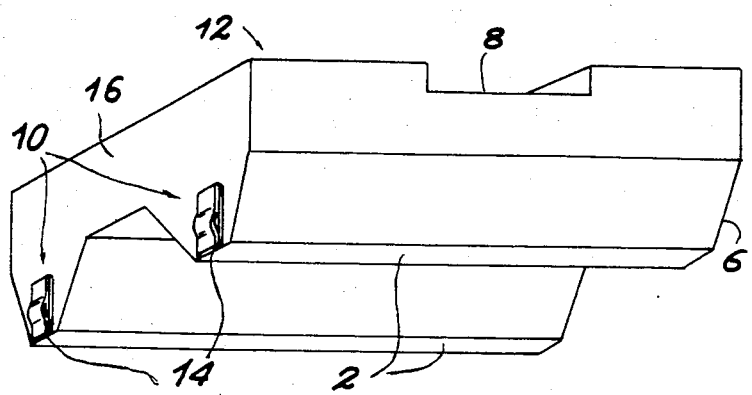
FIG. 1, already described, a prior art device.
Figure 2A:
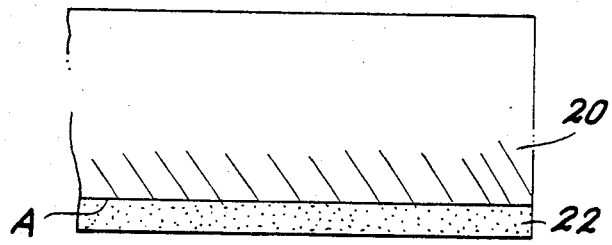
FIGS. 2a and 2b the preparation of a silicon substrate at the point of a future connection with the coils.

FIG. 2a shows a silicon wafer 20 of the type used in integrated circuit technology. A silica coating 22 is formed on the first face A of said wafer by oxidation. Areas 24 are freed in this oxide (FIG. 2b), followed by the deposition of metal conductors 26, which will form the output contact for the head coils.

The read and write heads having a horizontal structure are then formed on the same face A of the silicon wafer. The main stages of a possible process are illustrated by FIGS. 3 to 7. This process relates to a so-called horizontal recording head, which has two pole pieces separated by a non-magnetic coating. However, it would naturally also be possible to produce a perpendicular recording head comprising a single pole in the centre of the coil, the field lines closing by the lateral edges of the head.

Figure 2B:
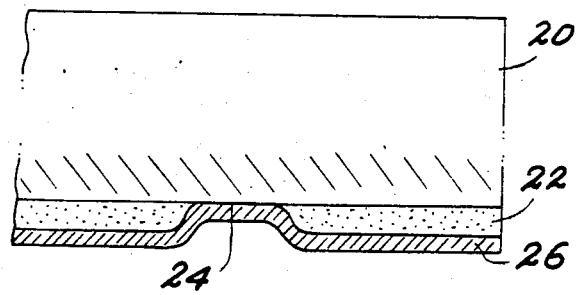
Figure 3:
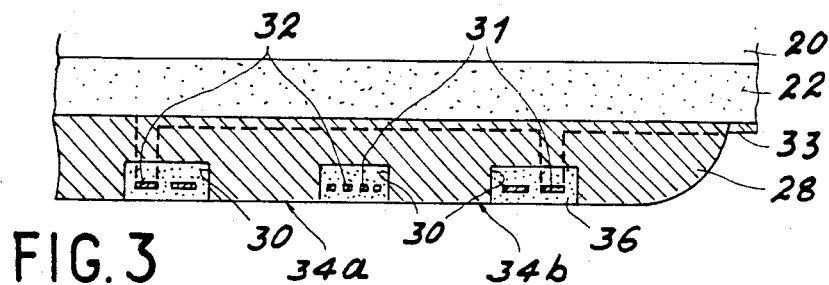
FIGS. 3 to 6 various production stages for a horizontal head.

FIG. 3 firstly shows the silicon wafer 20 with its silica coating 22, a magnetic coating 28 having been deposited on the assembly. Into the latter coating is etched a figure eight-like channel 30, which frees two pole pieces 34a, 34b. In the channel is formed a double spiral coil 31, 32 surrounding the two pole pieces 34a, 34b. The channel 30 is then filled with insulant 36. The output connections of the coil are formed by conductors 33, which join the already formed contacts 26 (FIG. 2b).

Figure 4:
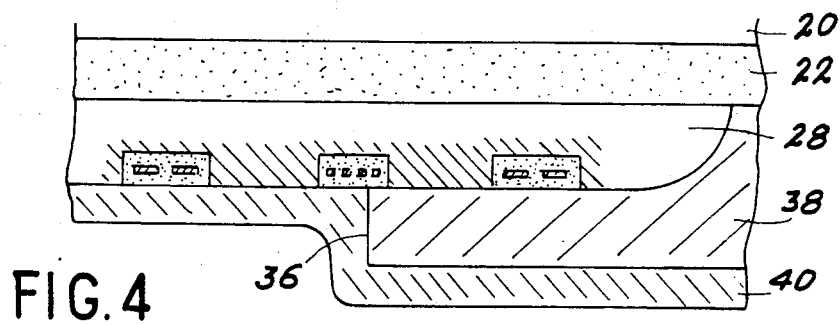
Figure 5:
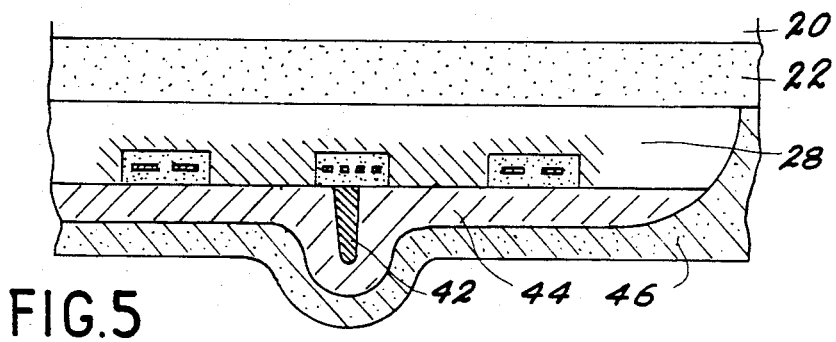
Figure 6:
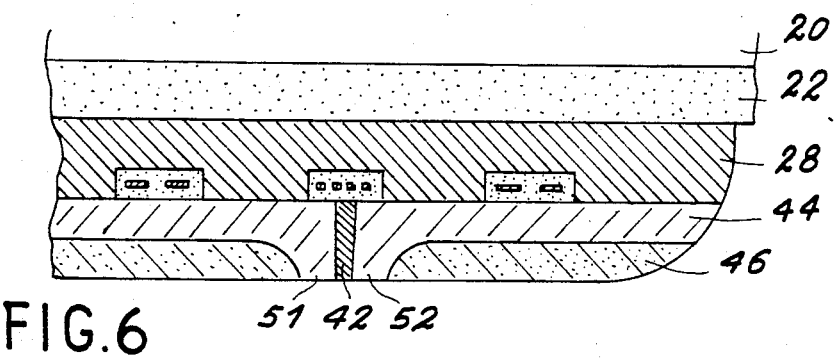

This is followed by the deposition on the assembly of a resin layer 38, which is etched so as to form a step 36 (FIG. 4). This step has a side 36 located between the pole pieces. A coating 40 of an non-magnetic material is then deposited on the assembly. This non-magnetic coating is removed, except on side 36, which leaves behing a vertical wall 42 (FIG. 5). This is followed by the deposition of a further magnetic coating 44, identical to coating 28, as well as a protective coating 46. These two coatings form a boss on wall 42.

This structure is then divided up in coating 46, so that two read and write pole pieces 52, 51 separated by the amagnetic wall 42 appear. The horizontal head is then formed.

Figure 7:
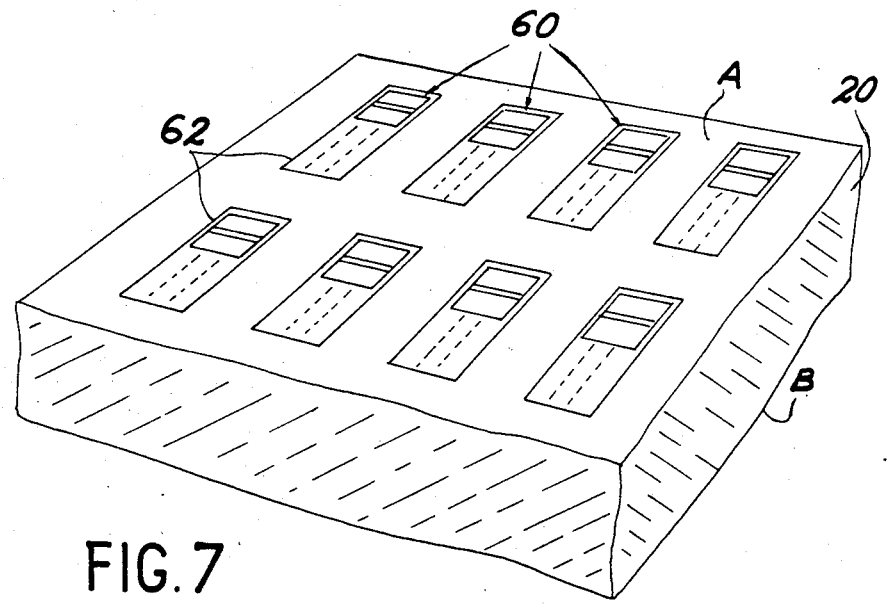
FIG. 7 a silicon wafer with read and write heads.

As is shown in FIG. 7 (which shows the silicon wafer turned around with respect to FIGS. 3 to 6), in reality a plurality of such heads 60 is formed on the same wafer. This is followed by the deposition on each of these heads of a layer 62 of resin or some other material serving as a mask, e.g. $SiO_2$, which is etched by photolithography. This is followed by the reticular etching of face A using a basic chemical solution. This etching gives rise to inclned sides.

Figure 8:
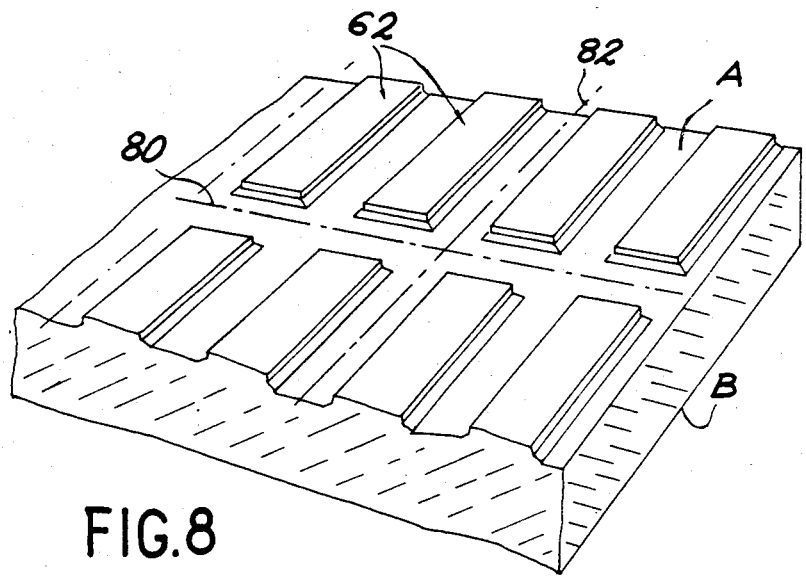
FIG. 8 the same substrate after reticular etching.

The result obtained is illustrated in FIG. 8. As the plane on which the heads are deposited in a 100 crystal plane, etching leads to the appearance of 111 crystal planes, which form the sides of reliefs, as well as chamfers at each end.

Figure 9:
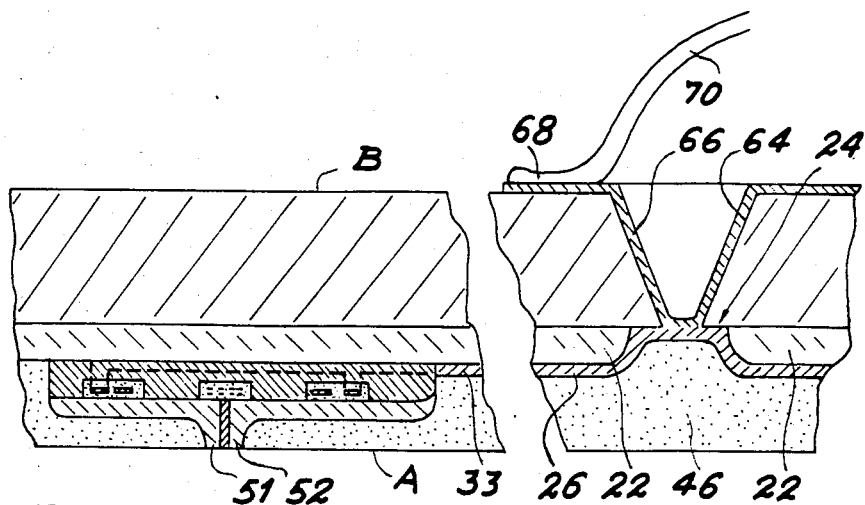
FIG. 9 a detail illustrating an electrical connection by the upper face of the substrate across a pyramidal hole.

Pyramidal holes are then formed on the second face B of wafer 20 in the form illustrated in FIG. 9. Once again using reticular etching, a pyramidal hole 64 is formed, whose walls are 111 crystal planes (at 55° relative to surface B). This hole traverses the wafer and reaches the metal coating 26 previously deposited in the opening 24 of the silica coating 22 (of FIG. 2b). The walls of this hole are then metallized by vacuum deposition of a metal coating 66. For example, this connection can be a copper coating deposited on a Cr attachment coating. This coatng covers the walls of the hole, as well as the bottom and extends over the upper face B of the wafer.

In this way, an electrical connection is formed between the two faces A and B of the silicon wafer. A plug socket 68 can then be easily formed with a connecting wire 70.

Figure 10:
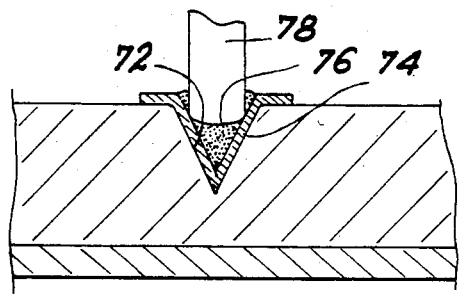
FIG. 10 a pyramidal centering hole.

FIG. 10 illustrated a final operation consisting of forming a pyramidal hole 72 in face B, which does not contain heads. This is a blind hole. The walls of the hole are then coated with a metal coating 74 which, by bonding or welding 76, permits the fixing of a holding pivot 78. A pressure for balancing the reach occuring during the displacement of the support is exerted on this pivot.

On returning to FIG. 8, once the heads have been deposited and the reticular etching operation is completed, the masking coating 62 is removed and the various supports are separated by cutting along cutting paths 80 and 82. Each support can then be mounted in its definitive equipment with its connections 70 (FIG. 9) and its holding pivot 78 (FIG. 10).

Figure 11:
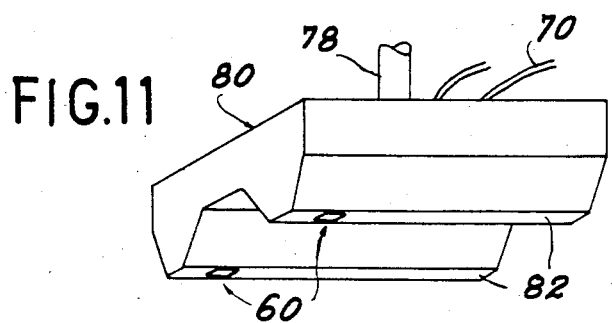
FIG. 11 a general view of the complete device according to the invention.

FIG. 11 shows the device obtained with its catamaran-like support 80, its two heads 60, the flight or displacement surface 82, the connection 70 and the pivot 78 on the opposite face.

It would naturally be possible to use other processes for producing the head, the essence being that this head has a horizontal structure and is arranged on the displacement faces of the catamaran.

What is claimed is:

1. A device for reading and writing on a magnetic recording support, comprising:

a monocrystalline silicon wafer having 100 and 111 crystal planes, said wafer having a bottom face parallel to 100 crystal planes and an upper face parallel to said bottom face, said wafer having its bottom face etched to comprise two sliders forming a catamaran-type profile, each slider having a bottom surface corresponding to said 100 crystal planes and two sides inclined in accordance with said 111 crystal planes, a magnetic read and write head being arranged on said bottom surface of each slider at one end thereof, each head having a coil in a plane parallel to said bottom surface and having at least one read and write pole, pyramidal holes having walls parallel to 111 crystal planes, said holes completely traversing said silicon wafer from said upper face down to said bottom face, said walls being covered with a first metal coating, a second metal coating being deposited on said bottom face in contact with said first metal coating and with said coil to provide for electrical connections along said metal coatings between said coils and an external circuit.

2. A device according to claim 1, wherein it also comprises on said upper face of the silicon wafer, a blind pyramidal hole with inclined walls in accordance with 111 crystal planes, a holding pivot being fixed within said hole.

3. A device according to claim 1, wherein the read and write head comprises two pole pieces separated by a non-magnetic wall.

* * * * *